United States Patent [19]

Kishi et al.

[11] Patent Number: 4,550,294
[45] Date of Patent: Oct. 29, 1985

[54] PATTERN INDICATION USING LASER BEAM

[75] Inventors: Yoshiki Kishi; Toyotoshi Hirotani; Tomohiro Ohira, all of Yatabe; Yukio Fukui, Ibaraki, all of Japan

[73] Assignee: Director-General of Agency of Industrial Science and Technology, Tokyo, Japan

[21] Appl. No.: 547,233

[22] Filed: Oct. 31, 1983

[51] Int. Cl.[4] .......................... H01S 3/10; G08C 9/00
[52] U.S. Cl. ................................ 332/7.51; 340/365 P
[58] Field of Search ................ 332/7.51; 340/365 P, 340/707, 708, 702; 358/105, 107, 285, 232, 233, 234, 235

[56] References Cited

U.S. PATENT DOCUMENTS

| 4,009,488 | 2/1977 | Smith | 358/62 |
| 4,122,438 | 10/1978 | Bird | 340/365 P |
| 4,302,681 | 11/1981 | Woodsford et al. | 250/556 |
| 4,329,684 | 5/1982 | Monteath et al. | 340/707 |

Primary Examiner—S. C. Buczinski
Assistant Examiner—Burton J. Carniol
Attorney, Agent, or Firm—Pahl, Lorusso & Loud

[57] ABSTRACT

A method of visually representing output data on a screen by deflecting a laser beam in both horizontal and vertical directions for scanning, and an indicating device for performing the above method. The laser beam is first divided into two polarized waves which are, after being modulated in accordance with the output data, combined into a first synthesized laser beam. The two polarized waves are alternately extinguished synchronously with a predetermined simple harmonic oscillation. The synthesized laser beam is then horizontally deflected by means of a sinusoidally oscillating mirror so that the angular displacement of the deflection oscillates in synchronism with the predetermined simple harmonic oscillation. The resultant deflected beam is again divided into two polarized waves, one of which is then inverted. The resulting two polarized waves are combined to obtain a second synthesized laser beam whose angular displacement in deflection is unidirectional at any phase. The second synthesized laser beam, after being vertically deflected, is projected on the screen for scanning.

4 Claims, 17 Drawing Figures

PATTERN INDICATION USING LASER BEAM

BACKGROUND OF THE INVENTION

This invention relates to a method and a device for visually representing output data on a screen by laser scanning.

It is known in the art to design electronic circuits or various other articles on a luminescent screen of a cathode ray tube (CRT) by means of a light pen under control of a computer. However, the CRT with a thick and curved glass on the front screen inherently has the problem that parallax occurs to the displayed picture image, making it extremely difficult to draw a pattern or picture with a light pen exactly in a desired manner or to make necessary additions or corrections directly to a represented pattern.

For the input of the pattern to be displayed on CRT, a digitizer is resorted to in some cases, drawing a desired pattern on the digitizer by means of a stylus. However, in such a case, the pattern drawn on the digitizer is displayed on a CRT which is located in a different position, so that as a matter of fact it is extremely difficult to make additions or corrections to a displayed pattern on the CRT.

SUMMARY OF THE INVENTION

It is an object of the present invention to provide an indicating device which can visually represent on a digitizer a pattern as drawn on the surface of the digitizer with a stylus.

It is a special object of the present invention to provide an indicating device of the above-mentioned type, which is capable of visually representing a pattern on the digitizer by laser beam scanning.

It is a further object of the present invention to provide a method of visually representing output data on a screen with the use of a laser beam.

Figure 1A:
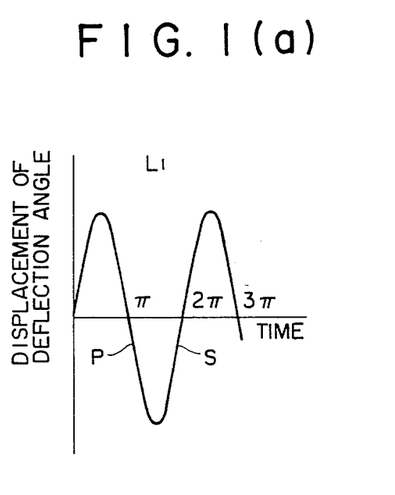
Figure 1B:
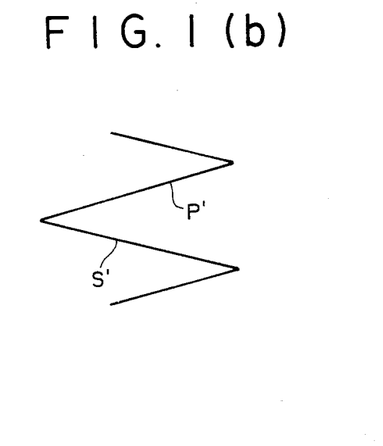

In order to effect the horizontal scanning by a laser beam, it is conceivable to deflect the beam horizontally by reflecting the beam on a mirror which is put in sinusoidal or simple harmonic oscillation, while deflecting the beam vertically in a similar manner. However, the resulting horizontally and vertically deflected laser beam cannot represent clear patterns or other picture images for the following reasons. Namely, if a laser beam is reflected on a sinusoidally oscillating mirror so as to sinusoidally displace the deflection angle of the beam as shown in FIG. 1(a), the oscillation of the laser beam deflection in the phase range of between $\frac{1}{2}\pi$ and $3/2\pi$ as indicated at P in FIG. 1(a) constitutes one horizontal scan line as denoted at P' in FIG. 1(b), and the oscillation in the range of between $3/2\pi$ and $5/2\pi$ as indicated at S in FIG. 1(a) constitutes the next horizontal scan line as denoted at S' in FIG. 1(b). Thus, the successive horizontal scan lines advance in a zig-zag fashion as a result of the simultaneous vertical deflection, failing to form such an appropriate picture image as formed by parallel scan lines. In this connection, if the picture image is formed only by alternate scan lines of the same direction, there will arise the problem of flickering of the display screen.

Figure 4A:
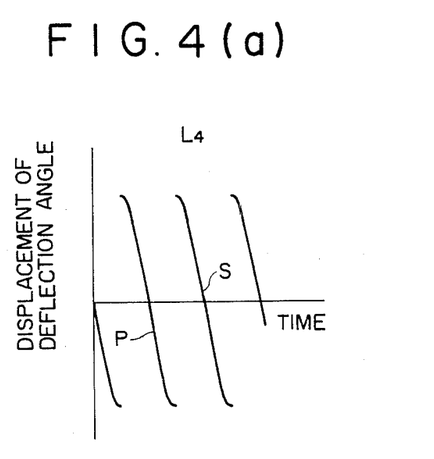
Figure 4B:
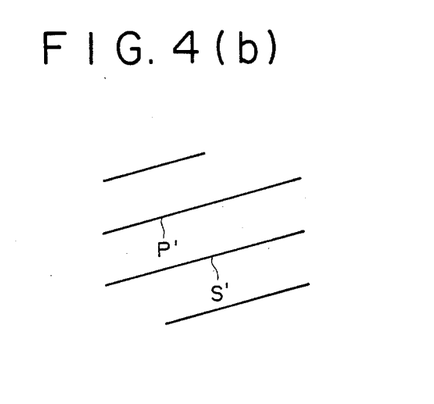

According to the present invention, a laser beam is split into two different kinds of polarized waves. One of the polarized waves is used for the oscillation in the range of $(2n+\frac{1}{2})\pi - (2n+3/2)\pi$ and the other polarized wave is used for the oscillation in the range of $(2n+3/2)\pi - (2n+5/2)\pi$, based on the simple harmonic oscillation of the reflecting mirror to obtain parallel horizontal scan lines as shown in FIG. 4(b).

BRIEF DESCRIPTION OF THE DRAWINGS

Other objects, features and advantages of the present invention will become apparent from the detailed description of the preferred embodiments of the invention which follows when considered in the light of the accompanying drawings, in which:

FIG. 1(a)-4(a) are graphs schematically showing the displacement of the deflection angle of a laser beam;

FIGS. 1(b)-4(b) are schematic representations of scan lines resulting from the laser beams of FIGS. 1(a) to 4(a), respectively;

DESCRIPTION OF THE PREFERRED EMBODIMENTS

Figure 5:
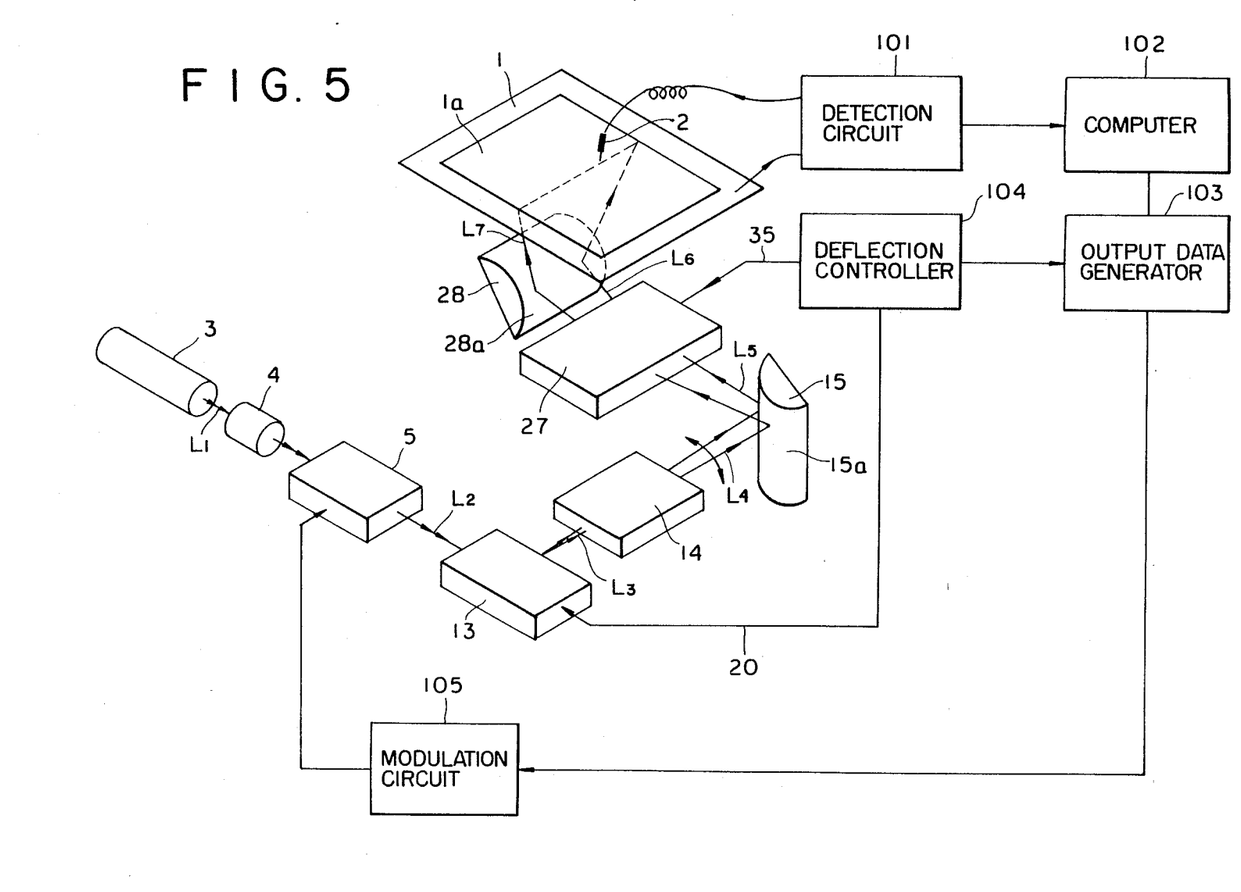
FIG. 5 is a block diagram schematically showing one embodiment of the indicating device according to the present invention.

Referring now to FIG. 5, the reference numeral 1 denotes a digitizer having a screen 1a on which characters, patterns and the like as drawn with a stylus 2 are visually represented. The screen 1a is preferably of a translucent type which can scatter an incident laser beam in various directions to improve its visibility. The digitizer 1 and the stylus 2 form, together with their control circuit 101, a coordinate detection means capable of detecting the pressure and the position of contact of the stylus with the screen of the digitizer, the detected signals being fed to processing means, described hereinafter, for processing the signals into output data which are to be visually represented on the screen.

In one embodiment, the digitizer is of a type which is provided with a multitude of sensing wires arranged on the backside surface of the screen and extending along the X and Y axes to form a matrix electrically coupled with the circuit 101. The stylus is also coupled with the circuit 101 and has a coil adapted for producing a magnetic flux upon being supplied with an electrical current and a pressure sensing means. When the tip of the stylus 2 is depressed on the screen 1a, an induced current is produced on the sensing wires so that the coordinates of the point of contact is detected and the circuit 101 generates a coordinate signal. At the same time, the pressure of the contact between the screen 1a and the stylus 2 is measured and the circuit 101 produces a concentration or intensity signal. The combination of the coordinate and concentration signals is fed to the processing means.

The processing means is comprised of a computer 102 and an output data generating circuit 103. The coordinate and concentration signals are read by the computer 102 and processed there to calculate the coordinate and concentration values which are demanded by the coordinate and concentration signals. A combination of the coordinate and concentration values is fed, for example in the form of a combination of binary codes of (X, Y) and (Z) or (X, Z) and (Y, Z) where X and Y stand for the coordinate values and Z stands for the concentration value, to the output data generating circuit 103 and stored there. The circuit 103 is coupled with a deflection control circuit 104 to receive therefrom synchronizing signals of both horizontal and vertical deflection. Each time when the output data generating circuit 103 receives horizontal deflection-synchronizing signal, the stored data are read out to generate output data of a raster unit. Upon each receipt of the vertical deflection-synchronizing signal, the circuit 103 returns the position of reading to the initial raster.

Thus, upon drawing a pattern or the like with the stylus 2 on the screen of the digitizer 1, the coordinates and the intensity of the contact are sequentially detected by the control circuit 101 and the corresponding signals are fed to the computer 102. After being processed by the computer, the signals are fed to the output data generating circuit 103 in which the concentration (tone) signals from the computer 102 is converted into output data synchronized with the horizontal and vertical deflections by control signals from the deflection control circuit 104. The output data such as picture and blanking signals are then fed to a laser beam modulation circuit 105.

Figure 6:
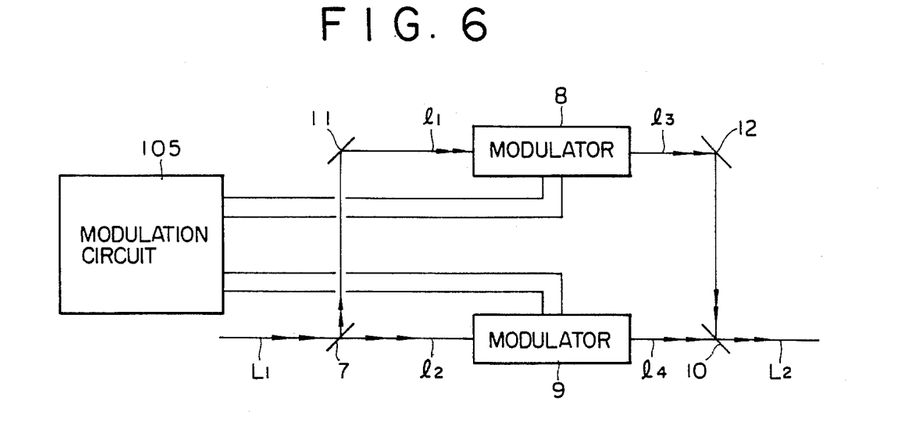
FIG. 6 is an explanatory view showing the manner of splitting and modulating a laser beam.

On the other hand, a laser beam which is generated from a laser tube 3 is sent to a polarization modulator 5 through a lens system 4. As shown particularly in FIG. 6, the polarization modulator 5 is provided with a beam splitter 7 which is adapted to split the laser beam $L_1$ from the laser tube 3 into two kinds of first and second polarized waves $w_1$ and $w_2$ (vertical and transverse waves). Provided in the light paths of the respective polarized waves $w_1$ and $w_2$ are first and second modulators 8 and 9 which are connected to the afore-mentioned laser beam modulation circuit 105. The circuit 105 generates a laser beam modulation signal in accordance with the output data from the circuit 103. The polarized waves $w_1$ and $w_2$ which are fed to the modulators 8 and 9 are modulated according to the modulation signals from the modulation circuit 105 so that the intensity of each polarized wave is varied in accordance with the modulation signals. Further, on the basis of the sinusoidal or simple harmonic oscillation of a flat mirror 16a of a horizontal deflector 13 which will be described hereinlater, the first modulator 8 modulates the wave $w_1$ to produce a modulated polarized wave $w_3$ which is periodically extinguished in the range of between $(2n+3/2)\pi$ and $(2n+5/2)\pi$ (n=an integer) of the phase of the oscillation. On the other hand, the second modulator 9 produces a modulated polarized wave $w_4$ which is periodically extinguished in the range of between $(2n+\frac{1}{2})\pi$ and $(2n+3/2)\pi$. Furthermore, in a stage subsequent to the modulators 8 and 9, there is provided a beam splitter 10 which synthesizes the couple of modulated polarized waves $w_3$ and $w_4$ into a synthesized laser beam $L_2$. The aberration of light between the two light paths between the beam splitters 7 and 10 is compensated for afterwards. In FIG. 6, the reference numerals 11 and 12 denotes mirrors for reflecting the polarized waves.

Figure 7:
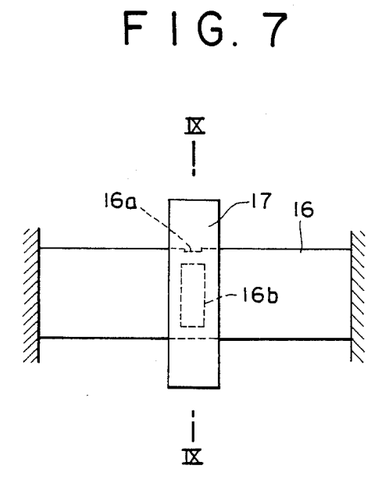
FIG. 7 is an elevational view diagrammatically showing one embodiment of the horizontal deflection means.
Figure 8:
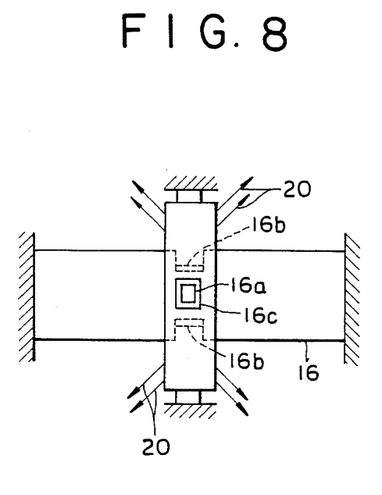
FIG. 8 is a plan view of FIG. 7.
Figure 9:
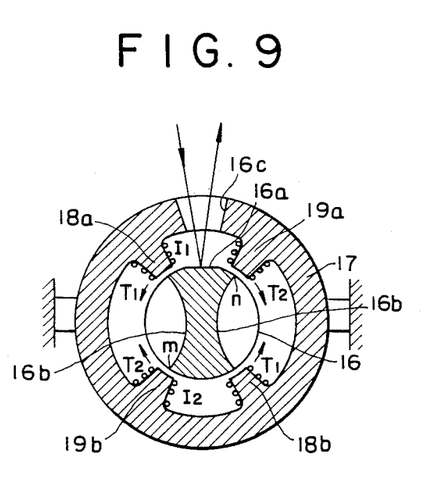
FIG. 9 is a cross-sectional view taken on the line IX—IX of FIG. 7.

The synthesized laser beam $L_2$ from the polarization modulator 5 is led to a first deflection means 13 for horizontal deflection. As for the first deflection means 13, there may be employed an arbitrary deflection means as long as it can deflect the incident laser beam such that the deflection angle of the deflected beam is angularly displaced sinusoidally at the frequency of at least 15 kHz. A sinusoidal oscillation of an extremely short period can be obtained easily by the use of a deflector as shown in FIGS. 7 to 9. In these Figures, indicated at 16 is a substantially cylindrical metal rod of a high magnetic permeability, such as structural carbon steel, which is stationally fixed at opposite ends and which is centrally provided with a pair of grooves 16b at radially opposite positions and a flat mirror 16a formed by polishing or vapor-depositing a metal after flattening part of the circumferential surface of the rod. The grooves 16b have no restrictions in particular with regard to their shape, but it is preferred that they have such a cross-sectional shape that the ends m and n of the two grooves are positioned symmetrically relative to the center axis of the rod 16 and that a straight line passing the end points m and n coincides with the tangential lines of the respective grooves at the points m and n (FIG. 9).

The metal rod 16 is concentrically and coaxially inserted in a stationary AC electromagnet ring 17 which is provided with two pairs of radially inwardly oriented opposing projections on the inner periphery, each having a coil wound therearound to provide two pairs of magnetic poles 18a and 18b, and 19a and 19b. With regard to the positional relationship between the metal rod 16 and the electromagnet, it is preferred that a vertical plane which passes the axis of the metal rod 16 and involves the points m and n coincides with a vertical plane passing the center axes of coils of opposing magnetic poles. The coils of the respective magnetic poles are connected to the afore-mentioned deflection control circuit 104 through lead wires 20.

Thus, upon supplying the two pairs of opposing coils with AC currents $I_1$ and $I_2$ with the same frequency (e.g., of 15 kHz) but with a phase difference of $\pi/2$, there are produced torques $T_1$ and $T_2$ by the AC magnetic fields, so that the metal rod 16 which is in fixed state is alternately twisted in the opposite directions due to its resiliency. As a result, the metal rod 16 is put in fine torsional elastic vibration at the same frequency as that of the AC current (e.g. 15 kHz) which is close to its resonance point and within its shear strength, angularly vibrating the flat mirror 16a on the metal rod 16 sinusoidally with a fine displacement angle (e.g. 0.05 radian). Therefore, the incident laser beam can be horizontally deflected at a small angle upon being reflected on the flat mirror 16a, the displacement of the deflection angle being sinusoidally oscillated synchronously with the AC currents $I_1$ and $I_2$. The reference numeral 16c denotes an aperture of the electromagnet ring 17 through which the incident and reflected beams pass. If desired, the metal rod 16 may be fixed only at one end thereof. The deflection control circuit 104 periodically generates the horizontal deflection-synchronizing signal in synchronism with the sinusoidal oscillation of the flat mirror 16a. For example, the signals are produced every time the displacement of the wave form of the current $I_1$ (or $I_2$) becomes minimum. The wave form of the current $I_1$ or $I_2$ is also utilized for synchronizing the extinction of the laser beams by the modulators 8 and 9 with the sinusoidal oscillation of the deflection angle of the laser beam.

Figure 2A:
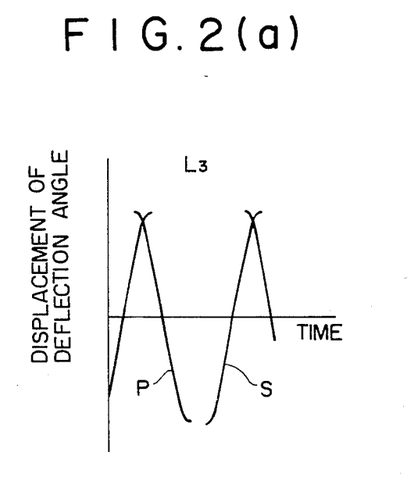
Figure 2B:
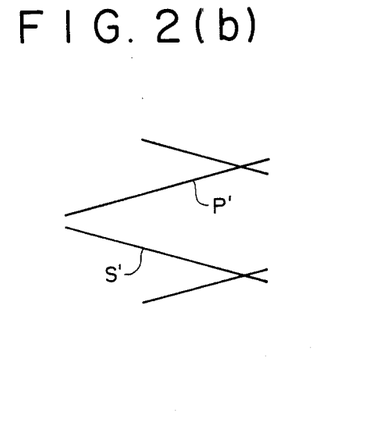

The synthesized laser beam $L_3$ resulting from the above-described horizontal deflection of the laser beam $L_2$ exhibits deflectional angular displacements which are inversed with a certain phase lag as shown in FIG. 2(a) and, hence the resulting scan lines are not parallel as shown in FIG. 2(b). Thus, the synthesized laser beam $L_3$ is then fed to a horizontal signal adjustor 14 where it is converted into a laser beam whose deflectional angle is, as shown in FIG. 4(a), displaced with a period of $\pi$.

Figure 3A:
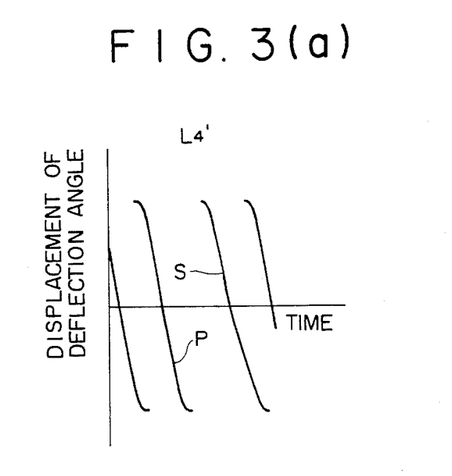
Figure 3B:
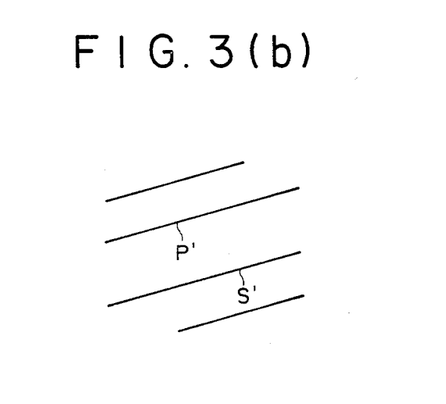
Figure 10:
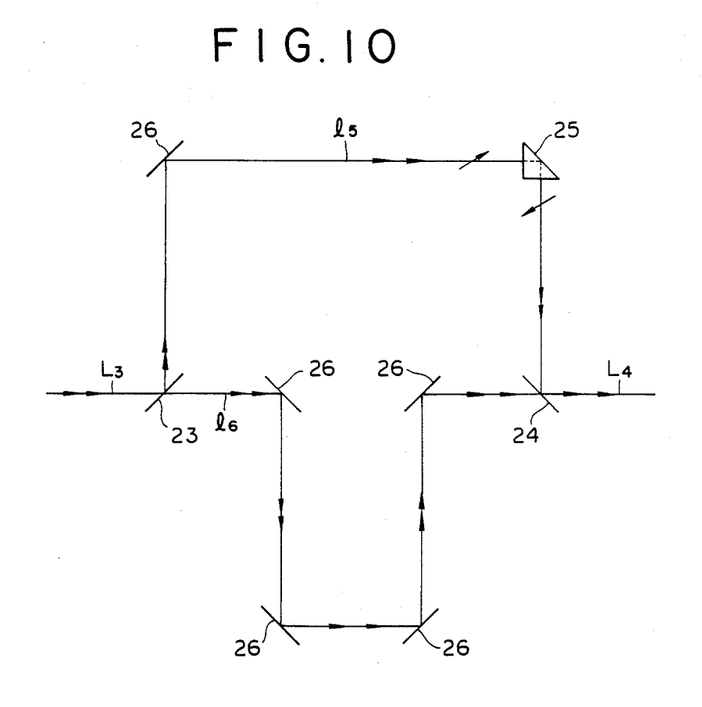
FIG. 10 is an explanatory view showing the manner of inverting a polarized laser beam and adjusting the length of path of another polarized laser beam.

As shown particularly in FIG. 10, the horizontal signal adjustor 14 is constituted by a pair of third and fourth beam splitters 23 and 24 which separate and synthesize laser beams $L_3$ and $L_4$, respectively, an inversion prism 25 provided between the beam splitters 23 and 24 to invert the image, and a plural number of mirrors 26. Upon transmission through the third beam splitter 23, the laser beam $L_3$ is separated into a polarized wave $w_5$ corresponding to the first polarized wave $w_1$ and a polarized wave $w_6$ corresponding to the second polarized wave $w_2$. By inverting one of the two polarized waves $w_5$ and $w_6$, for example, the polarized wave $w_5$, by means of the inversion prism 25, the deflectional angular displacements of the two polarized waves are oriented in the same direction. Simultaneously, the light path of the other polarized wave $w_6$ is extended by the mirrors 26 to adjust the phase lag between the two polarized waves to $\pi$. In the next stage, these polarized waves are synthesized by the fourth beam splitter 24 to produce the synthesized laser beam $L_4$ whose deflectional angle is displaced with a period $\pi$. FIGS. 3(a) and 3(b) diagrammatically illustrate the above-mentioned inversion and adjustment of the light path. The polarized wave which corresponds to S in FIG. 2(a) is inverted by means of the inversion prism 25 to have the same displacement as P. The scan lines become parallel as shown in FIG. 3(b) as a result of this inversion but they are not yet uniformly spaced by a phase lag of $\pi$ like in FIG. 4(b) until the light path is adjusted as mentioned above.

The deflectional angle of the synthesized laser beam $L_4$ thus obtained is very fine and therefore insufficient for effecting the horizontal scanning. Besides, the displacement by sine wave vibration results in a scan line the light density of which is lowest at the center and becomes higher toward the opposite ends.

The synthesized laser beam $L_4$ is then led to a curved deflection mirror 15 which serves to enlarge the horizontal deflection angle of the synthesized laser beam $L_4$ and to equalize the scanning speed of each horizontal scan line. The mirror 15 is provided with a mirror surface 15a of a curvature which can uniformalize the horizontal deflection speed of the synthesized laser beam $L_4$ after reflection thereon. Since the synthesized laser beam $L_4$ itself is inevitably spread, in the sense of wave optics, upon reflection on the mirror surface 15a, it is preferable to previously impart a negative spread angle to the synthesized laser beam $L_4$ by providing, for example, a lens in the light path of the laser beam $L_2$ prior to the deflection. In a case where it is difficult to obtain from a single curved horizontal deflection mirror 15 a deflection angle which is large enough for scanning the full width of the screen of the digitizer 1, there may be employed a multi-stage deflection means using a number of similar curved horizontal deflection mirrors.

Figure 11:
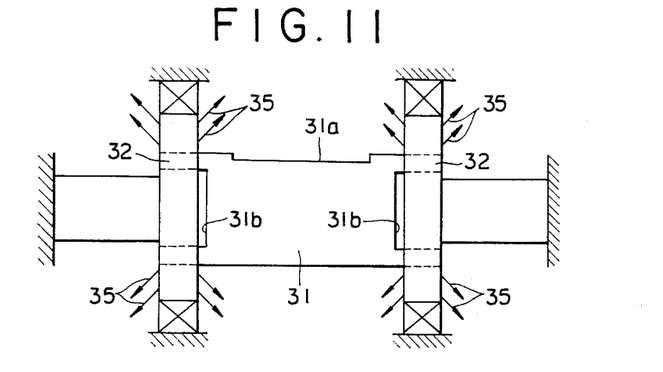
FIGS. 11 through 13 are schematic representations, similar to FIGS. 7 through 9, respectively, showing an example of the vertical deflection means.
Figure 12:
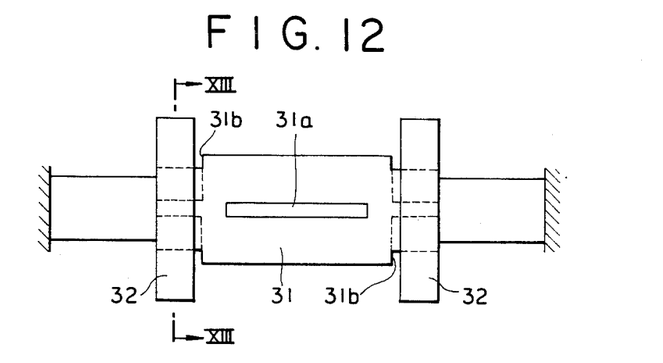
Figure 13:
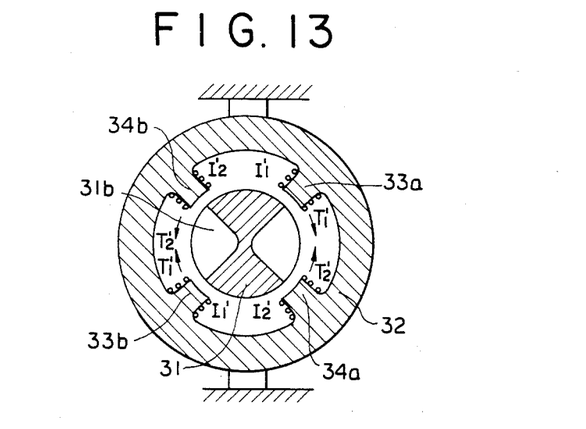

The synthesized laser beam $L_5$ thus obtained is then led to a second deflection means 27 to undergo vertical deflection. The second deflection means may be of an arbitrary construction as long as it can effect the vertical scanning at a frequency, for example, of about 60 Hz. FIGS. 11 to 13 show one preferred form of the second deflection means, which is same as the deflector of FIGS. 7 to 9 in their principles and wherein indicated at 31 is a cylindrical metal rod of a high magnetic permeability which is fixed at opposite ends and provided with an axially extending flat mirror surface 31a centrally on its circumference. The metal rod 31 is provided with a pair of grooves 31b on the opposite sides of the flat mirror 31a and surrounded by a pair of electromagnets 32. Each of the electromagnets 32 has two pairs of radially opposing magnetic poles 33a and 33b, and 34a and 34b with their respective coils connected to the afore-mentioned deflection control circuit through lead wires 35. The shape of the grooves and their positional relationship of the magnetic poles are the same as described previously with reference to FIGS. 7 to 9.

Upon supplying the coils of the two pairs of magnetic poles with low frequency currents $I_1'$ and $I_2'$ (e.g., of 15 Hz), respectively, which have a phase lag of $\pi/2$ from each other, the metal rod 31 is twisted alternately in the opposite directions by torques $T_1'$ and $T_2'$, putting the mirror 31a in fine torsional elastic vibration. Thus, when the synthesized laser beam $L_5$ is introduced for reflection on the mirror 31a such that the plane in which the incident beam $L_5$ deflects horizontally is made parallel with the axis of the metal rod 31, it is subjected to the vertical deflection. Since the metal rod 31 is twisted by a pair of electromagnets 32, the deformation of the mirror 31a is suitably prevented. Further, the coils are supplied with low frequency currents, so that, if the metal rod 31 is designed to have a large torsional spring constant, it can be angularly vibrated according to the applied torques. If desired, the metal rod 31 may be fixed only at one end thereof similarly to the case of the metal rod 16. The deflection control circuit 104 periodically generates the vertical deflection-synchronizing signal synchronously with the periodical displacement of the laser beam $L_7$. The waveform used for producing the horizontal-deflection synchronizing signal may also be used for the vertical-deflection synchronizing signal.

The laser beam $L_6$ which has undergone the vertical deflection of fine angle is led to a curved mirror 28 similar to the aforementioned curved mirror 15, thereby to enlarge the vertical deflection angle and at the same time to regulate the vertical deflection speed for equalizing the scan speed in vertical scanning. The laser beam $L_7$ reflected from the mirror surface 28a is projected toward the back side of the digitizer, scanning the screen horizontally by the horizontal deflection by the first deflection means 13 and vertically by the vertical deflection by the second deflection means 27 to visually represent on the screen the output pattern generated from the processing means in accordance with the pattern drawn on the screen 1a with the stylus 2.

In this manner, the image of a picture or a pattern drawn on front side of the digitizer 1 is visually represented by the laser beam scanned from the back side thereof and the correction thereof or the addition thereto can be easily made with the stylus 2 while observing the visuallized pattern.

The data of a pattern or the like which is drawn on the digitizer with the stylus 2 are fed to the computer 102 as its input. At the same time, the digitizer serves to functions as an output device for visually representing information which has been stored and processed by the computer.

The invention may be embodied in other specific forms without departing from the spirit or essential characteristics thereof. The present embodiments are therefore to be considered in all respects as illustrative and not restrictive, the scope of the invention being indicated in the appended rather than by the foregoing description, and all the changes which come within the meaning and range of equivalency of the claims are therefore intended to be embraced therein.

We claim:

1. A device for visually representing on a screen output data generated from an output data generator, comprising:
    (a) a laser beam modulation circuit supplied with the output data and generating modulation signals in accordance with the output data;
    (b) a first beam splitter for separating by polarization a laser beam from a laser source into a first polarized wave and a second polarized wave;
    (c) a first modulator connected to the laser beam modulation circuit for modulating said first polarized wave according to said modulation signals so that the intensity of said first polarized wave is varied in accordance with said modulation signals and said first polarized wave is periodically extinguished in synchronism with a predetermined simple harmonic oscillation for a period in the range of between $(2n+3/2)\pi$ and $(2n+5/2)\pi$ of the phase of said predetermined simple harmonic oscillation;
    (d) a second modulator connected to said laser beam modulation circuit for modulating said second polarized wave according to said modulation signals so that the intensity of said second polarized wave is varied in accordance with said modulation signals and said second polarized wave is periodically extinguished in synchronism with said predetermined simple harmonic oscillation for a period in the range of between $(2n+\frac{1}{2})\pi$ and $(2n+3/2)\pi$ of the phase of said predetermined simple harmonic oscillation;
    (e) a second beam splitter arranged for receiving the polarized waves from said first and second modulators and for forming a synthesized laser beam;
    (f) a first deflection means having a flat mirror located for receiving said synthesized laser beam and arranged to perform said predetermined simple harmonic oscillation so that the incident synthesized laser beam is deflected with its deflectional angular displacement oscillating in synchronism with said predetermined simple harmonic oscillation;
    (g) a third beam splitter receiving the deflected laser beam from said first deflection means for separating same into third and fourth polarized waves corresponding to said first and second polarized waves, respectively, and a fourth beam splitter for synthesizing said third and fourth polarized waves;
    (h) an inversion prism located in a light path between said third and fourth beam splitters for inverting either one of said third and fourth polarized waves;
    (i) light path length adjusting means located in a light path between said third and fourth beam splitters for adjusting the length of light path of said third and/or fourth polarized waves such that the deflection angle of the deflected synthetic laser beam from said fourth beam splitter is displaced at a cycle of $\pi$ based on said predetermined simple harmonic oscillation; and
    (j) a second deflection means receiving the deflected synthetic laser beam from said light path length adjusting means for deflecting and projecting same on said screen; whereby said first and second deflection means scan the modulated laser beam horizontally and vertically to visually represent the output pattern on said screen.

2. A device as set forth in claim 1, further comprising:
    coordinate detection means including a digitizer having its surface constituted by said screen, and a stylus for contact with said screen, said coordinate detection means being capable of detecting the pressure and the position of the point of contact between said screen and said stylus and of generating corresponding detection signals; and
    processing means supplied with the detection signals for processing same into the output data, whereby as a pattern is drawn on said screen with said stylus, it is fed to said processing means and converted into the output data which are visually represented on said screen.

3. A device as set forth in claim 1, wherein said first deflection means includes a cylindrical metal rod adapted for angular vibration about its axis and having said flat mirror formed on its outer periphery, and an AC electromagnet having two pairs of opposed magnetic poles located on a plane which is vertical to the axis of said metal rod and surrounding said metal rod, said pairs of magnetic poles being supplied with AC currents with a phase difference of $\pi/2$ so that when the AC currents are supplied to said magnetic poles, said metal rod is angularly vibrated sinusoidally with said flat mirror being angularly oscillated sinusoidally synchronously with the AC currents.

4. A method of visually representing output data on a screen, comprising:
    introducing a laser beam into a first splitter to divide the laser beam into first and second polarized waves;
    modulating the first and second polarized waves to vary the intensity of the waves in accordance with the output data and to alternately extinguish the first and second polarized waves in synchronism with a predetermined simple harmonic oscillation for a period so that the first polarized wave is periodically extinguished in the range of between $(2n+3/2)\pi$ and $(2n+5/2)\pi$ of the phase of said predetermined simple harmonic oscillation and the second polarized wave is periodically extinguished in the range of between $(2n+\frac{1}{2})\pi$ and $(2n+3/2)\pi$ of the phase of said predetermined simple harmonic oscillation;
    combining the modulated laser waves to synthesize a first synthesized laser beam;
    deflecting said first synthesized laser beam in one plane such that the angular displacement of the deflection sinusoidally oscillates in synchronism with said predetermined simple harmonic oscillation;
    introducing the deflected synthesized laser beam into a second beam splitter to divide same into third and fourth polarized waves;
    inverting either one of said third and fourth polarized waves;
    combining the third and fourth polarized waves to synthesize a second synthesized laser beam;
    adjusting the length of light path of said third and/or fourth polarized waves so that the angular displacement of the deflection of the second synthesized laser beam oscillates with a cycle of $\pi$ based on said predetermined simple harmonic oscillation; and deflecting said second synthesized laser beam in a plane vertical to the plane in which the incident second synthesized laser beam oscillates, so that the screen is horizontally and vertically scanned with the deflected second synthesized laser beam to visually represent the output data on the screen.

* * * * *